United States Patent [19]

Arora

[11] Patent Number: 4,704,905
[45] Date of Patent: Nov. 10, 1987

[54] AUTOMATION CONTROL APPARATUS

[75] Inventor: Arvind Arora, Moorpark, Calif.

[73] Assignee: Photoacoustic Technology, Inc., Newbury Park, Calif.

[21] Appl. No.: 873,470

[22] Filed: Jun. 9, 1986

Related U.S. Application Data

[63] Continuation of Ser. No. 658,622, Oct. 9, 1984, abandoned.

[51] Int. Cl.$^4$ .............................................. G01N 29/04
[52] U.S. Cl. ......................................... 73/596; 73/602
[58] Field of Search ................. 73/596, 597, 598, 599, 73/600, 602, 571

[56] References Cited

U.S. PATENT DOCUMENTS

| | | | |
|---|---|---|---|
| 2,612,772 | 10/1952 | McConnell | 73/598 |
| 2,618,968 | 11/1952 | McConnell | 73/599 |
| 2,667,063 | 1/1954 | Cunningham | 73/598 |
| 3,108,469 | 10/1963 | Dyer et al. | 73/597 |
| 3,504,532 | 4/1970 | Muenow et al. | 73/597 |
| 3,719,922 | 3/1973 | Lopes et al. | 73/602 |
| 3,848,460 | 11/1974 | Bantz et al. | 73/597 |
| 3,952,578 | 4/1976 | Jacobs | 73/597 |
| 4,384,489 | 5/1983 | Crutzen et al. | 73/602 |

FOREIGN PATENT DOCUMENTS

| | | | |
|---|---|---|---|
| 3002262 | 3/1981 | Fed. Rep. of Germany | 73/596 |
| 2070248 | 2/1981 | Italy | 73/596 |

Primary Examiner—Anthony V. Ciarlante
Attorney, Agent, or Firm—Gregory O. Garmong

[57] ABSTRACT

An automation control apparatus for determining whether there is an article within a target area, and, if so, whether the article meets certain predefined acceptability criteria. The control apparatus emits a beam of acoustic energy into the target area and receives back the reflected signal from the area. The received signal is then amplified to account for normal attenuation, and the amplified signal is tested to determine whether its transit time or amplitude indicates the presence of an object within the specified area. If an article is present, waveform analysis is performed on the amplified signal to determine the signature of the article, so that the signature may be compared with predetermined acceptable values. If an object is present and the object meets the acceptability criteria to be classified as a desired article, then a positive indication is provided. Conversely, a negative indication is made if an acceptable article is not present. The described apparatus may be used as one of a plurality of individual automation control components in a coincidence control apparatus involving a plurality of articles, wherein a coincidence detection unit determines whether the output signals of the respective control components occur in a preselected timed relationship to each other, as may be required. If coincidence is not achieved, warning signals are provided to other automated machines, as to sorting machines.

14 Claims, 11 Drawing Figures

AUTOMATION CONTROL APPARATUS

This application is a continuation of application Ser. No. 658,622, filed Oct. 9, 1984 now abandoned.

BACKGROUND OF THE INVENTION

This invention relates generally to the control of automated processes, and, more particularly, to an automation control apparatus for determining the presence of articles meeting acceptability criteria.

In modern production line operations, machines are often highly dependent upon each other, and errors by one machine may not be readily detected by other machines. Consequently, errors by one machine, or problems arising after an article leaves one machine but before it arrives at the next machine, may not be immediately discovered, so that the problem is propagated through the remainder of the automated operation.

As an example, problems can often arise at the end of the production line at the packaging station. If a fixed number of a single article is to be inserted into one package and a feed machine supplies a different number to the packaging machine, the wrong number of articles may be packaged. Or, if fixed numbers of several different articles are to be packaged together, a malfunction by any one of the machines feeding the articles to the packaging machine can result in an package containing incorrect contents. Similar problems can arise in other automated contexts, as, for example, an assembly machine that receives the wrong parts to be assembled.

There are several well established approaches for avoiding these kinds of problems in automated operations. Human operators and inspectors are sometimes provided at various points to oversee the operations, or inspect or count articles. The use of this human intervention is undesirable, in that the work is often unfulfilling and dull for the worker, and has the result that errors often arise in spite of the human presence. Human labor is also expensive, detracting from the full automation of the operation. Human intervention is sometimes not practical, as where monitoring involves very rapid response or making fine distinctions that are beyond human capability. A human being cannot properly count and verify the identity of, for example, 50 articles per second passing to a packaging machine.

Automatic process controls suitable for use in a production line environment are also known. The most common such controls are scales for weighing articles and photosensor systems wherein the presence of an article may be detected by the breaking of a light beam. Although relatively simple in operation, each of these approaches has distinct drawbacks. Neither weighing nor a light beam can detect when the wrong piece is present, if the piece has generally the same weight and shape as the intended article. Thus, for example, a bolt could be mistakenly packaged instead of a washer having the same weight, or a number of lighter articles could be mistaken for a heavier article, in an apparatus using scales to monitor packaging. Moreover, if the scale apparatus itself malfunctions as by hangup of an article when the articles are removed from the scale, the same article may be weighed repeatedly but never be packaged.

Use of light beams suffers from the problem that they cannot be used in many dirty environments due to interference with the beam, and also cannot be used in conjunction with certain oddly shaped articles or transparent articles. Weight and light beam systems also cannot provide information about, or control over, articles that may be present but misoriented, where the misorientation is critical.

The existing process control systems are also not well adapted to the control of time-sequenced operations requiring, for example, that different parts arrive at a station in some predetermined sequence. It is not now generally possible to determine whether the necessary numbers of the proper articles arrive at the right time, except in a few situations.

Accordingly, there has been a need for an apparatus which allows the determination of the presence of an object, and further allows the analysis of the object to be certain that it is the right article, all of this being operable in adverse environments. The apparatus should also allow control of time-sequenced operations involving various types of parts. The present invention fulfills this need, and further provides related advantages.

SUMMARY OF THE INVENTION

The present invention resides in an apparatus which allows the detection of the presence of an article, and further analyzes a "signature" characteristic of the article. If the apparatus shows that some object is present, then its signature is analyzed and compared with predetermined signature information characteristic of the article that is desirably present. If the two signatures coincide or are sufficiently close, then logic in the apparatus concludes that the correct article is present and so signals for the purpose of counting, or accepting or rejecting a situation. Error signals can also be positively indicated. This unit of apparatus may be used as a building block in conjunction with other units and in conjunction with a coincidence detector, to control the operation of machinery requiring the coincidental or time-sequenced provision of multiple articles. The apparatus of the invention is operable in adverse environments, and is relatively inexpensive to build and maintain. Internal testing functions are provided, and no operator training is necessary.

In accordance with the invention, an automation control apparatus for determining whether an object is within a target area, and, if so, for determining whether the object meets predetermined acceptability criteria so as to be classified as an acceptable article, comprises means for emitting a beam of acoustic energy toward the target area; means for receiving a signal back from the target area; means for amplifying the signal received back from the target area; means for determining whether the amplified signal has an amplitude greater than a predetermined value; waveform analysis means for analyzing the amplified signal to determine its waveform characteristics, and for comparing the waveform characteristics with predetermined acceptability criteria; and means for signalling the presence and acceptability of the article. The automation control apparatus may also be provided with means for determining whether a signal falls within a predetermined time window. The means for signalling may include means for providing signals of either the presence or absence of an acceptable article, and for providing appropriate information to related apparatus such as batching, sorting and packaging machines. Specialized features may be added for particular applications, such as emitting means operating through acoustic lenses, multiple emitting and receiving means for surface recognition and contour imaging, and interfacing with robotic apparatus.

In accordance with another aspect of the invention, an automation coincidence control apparatus for determining whether a plurality of objects are within a plurality of respective target areas, and, if so, for determining whether the respective objects meet predetermined acceptability criteria to be classified as the desired articles, the presence of acceptable articles to occur within a predetermined timed relationship to each other, comprises a plurality of automation control apparatus components as described previously, with the respective signal outputs being provided to coincidence detection means for determining that the respective signals occur in a preselected timed relationship to each other.

Preferably, the automation control apparatus includes an acoustic transreceiver mounted adjacent a "target area", which is the area that has been preselected to contain the article upon its arrival. The transreceiver can emit a continuous acoustic wave, but more preferably emits pulse trains of controllable frequency, rise time, and duration. The acoustic waves are reflected from whatever material is in the target area, and a portion of the waves is received back at the transreceiver. The signal received is amplified to account for the natural attenuation of the signal propagated through an environment. The transit time and maximum amplitude of this amplified signal are then tested to determine whether the amplitude is sufficiently great, as compared with a predetermined value, to conclude that an object of some kind is present within the target area, and whether the object is present in a desired time window. If so, then the waveform of the amplified signal is analyzed to determine whether the acoustic signature received corresponds with that of the desired article. Several different waveform analyses are possible, including maximum peak detection, ringdown counting, rise time, duration, decay rate, and spectrum analysis such as phase measurement and Fourier transformation. The time delay between emission of the acoustic wave and receipt of the reflected wave also provides signature information. The exact information required to discriminate between the desired article and all other possibilities, with reasonable certainty, is previously determined for each such article and stored in the memory of the apparatus. Once the presence of the correct article or articles is established, then the automation control apparatus counts the articles, signals the packaging or other machine under control that the proper articles are present, and performs any subsidiary functions. If the proper articles are not found to be present, the apparatus can remove the problem material and activate a sorting machine for resolution of the problem, without incurring downtime for the main operation.

The automation coincidence control apparatus performs similar functions, but typically in relation to a plurality of different types of articles. In one such application, the output signals from a plurality of automation control apparatus units, each monitoring a different input feed, are provided to a coincidence detector. The coincidence detector determines the time relationship between the signals which indicate that the respective articles of the right type have arrived, and compares this timed sequence to a preselected relationship previously provided to the memory of the coincidence detector. If the preselected relationship is met, then further processing can continue. If the preselected relationship is not met, then a sorting or rejecting operation is initiated. For example, if it is required that two different articles arrive within some fixed period of time of each other, the coincidence control apparatus can ensure that the proper types of articles do in fact arrive, and that the arrival follows the preselected timed relationship. Otherwise, the articles are rejected.

It will be appreciated from the foregoing that the present invention represents an important advance in the field of the control of automated processes. The apparatus of the present invention allows not only the determination that an object is present at the proper place and the proper time, but also the determination that the object is in fact the proper article. The principles can be extended to multiple articles required in an operation, and further to the requirement that the articles be present coincidentally or in some time-sequenced relationship. Use of acoustic waves to scan the target area allows operation in adverse environments, as where light is so scattered as to be unusable, and also allows extensive waveform signal processing with relatively inexpensive, field-tested components. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
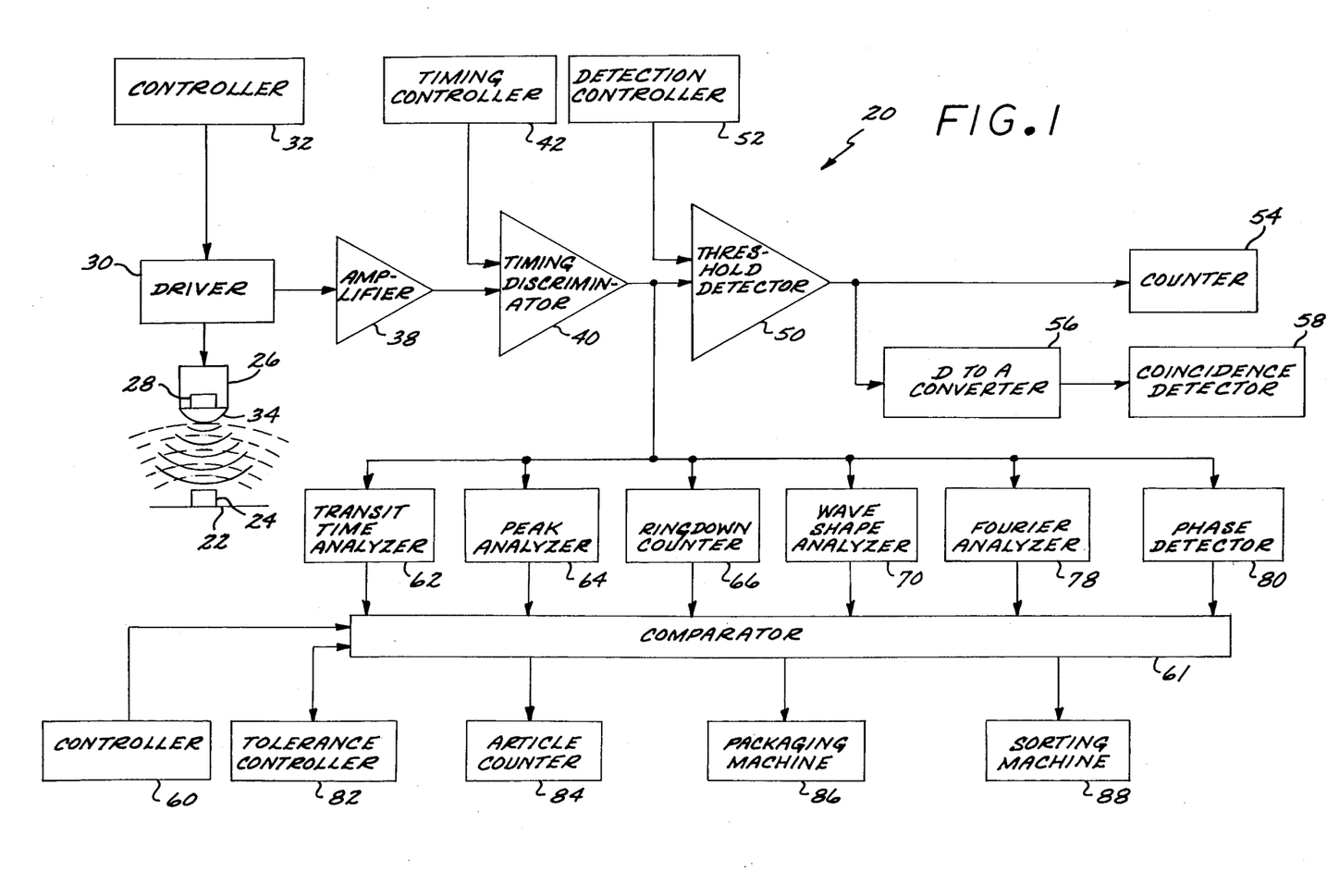
FIG. 1 is a partially schematic, partially block diagram of an automation control apparatus.

As illustrated in the FIG. 1 for a preferred embodiment of the invention dealing with the control of automated packaging machinery, an automation control apparatus, generally indicated by the numeral 20, scans a target area 22, which is typically a particular location on a conveyor belt or other means for transporting an article 24. At some times, the target area 22 will have no articles or other detectable objects therein, while at other times either articles 24 or other objects may be found in the target area 22. For the embodiment illustrated in FIG. 1, only articles 24 are to be recognized and counted for packaging. That is, some fixed number of articles 24 are to be packaged. If any other objects that are not articles are detected in the target area 22 as a number of articles are being accumulated for packaging in a single package, then that entire lot to be packaged together is taken to be suspect, and sorted out for analysis of the unknown item detected in the target area 22. Other arrangements are also possible, such as discarding only the unknown item detected in the target area 22.

In accordance with this preferred embodiment of the invention, the automation control apparatus 20 includes an acoustic transreceiver 26 having a piezoelectric element 28 for transmitting a beam of acoustic energy toward the target area 22, and receiving signals reflected from whatever is located within the target area 22, if anything. The transreceiver 26 is activated by a transreceiver driver 30, which excites the piezoelectric element 28 with energy of an amplitude and frequency that is selectable and input by the operator through a driver controller 32. The operator also selects a continuous or burst excitement mode, and, if the latter, the repetition rate and duration of the bursts. Inasmuch as the burst excitement mode provides the greatest information about the nature of anything within the target area 22, the burst mode is preferred.

Figure 2:
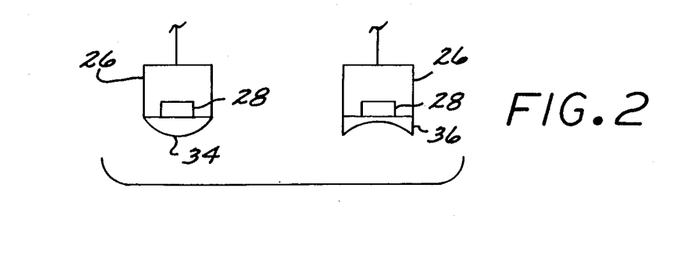
FIG. 2 is a schematic illustration of acoustic transmitters utilizing acoustic lenses.

The transreceiver 26 may incorporate an acoustic lens for diffusing or focussing the acoustic beam for proper reflection from the target area 22. The transreceiver 26 of FIG. 1 is illustrated with a convex lens 34, which diffuses the acoustic beam to cover a wide area, as where the article 24 is large in size. This type of lens is again illustrated on the left hand side of FIG. 2, while the transreceiver 26 on the right hand side of FIG. 2 is illustrated with a concave lens 36 to focus the acoustic beam to small size, as where the article 24 is small in size and it is desired to avoid interference by neighboring objects. The acoustic lenses 34 and 36 are conveniently shaped metallic pieces attached to the piezoelectric element 28.

The signal received back from the target area 22, by the transreceiver 26, is provided to a band pass amplifier 38, wherein the generally low level signal is amplified to a level convenient for signal processing. The signal is generally attenuated by the passage from the transreceiver 26 to the target area 22, the interaction with any object which might be in the target area 22, and the return trip back to the transreceiver 26. The gain on the amplifier 38 may be adjusted accordingly.

Figure 3:
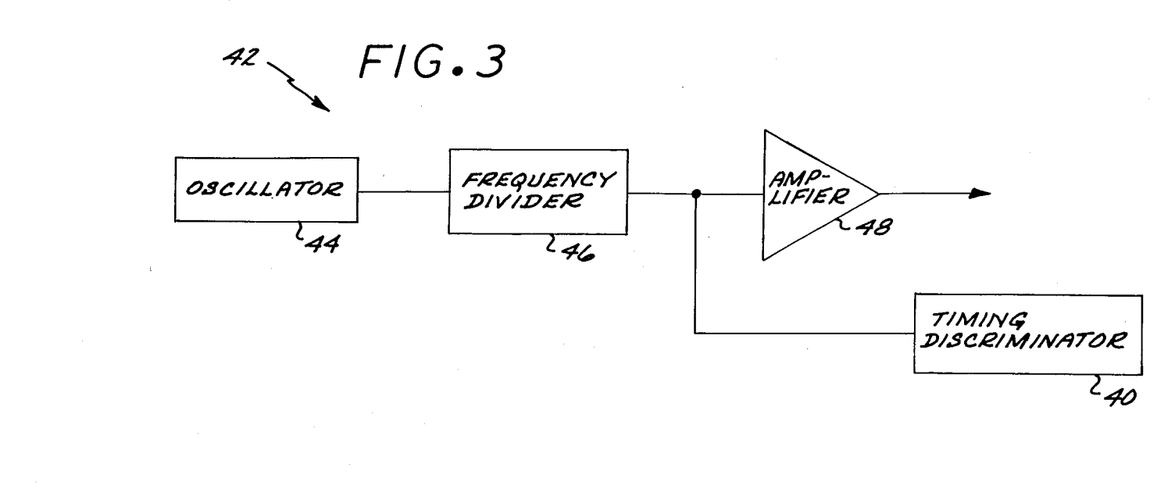
FIG. 3 is a block diagram of an electronic clock.

The amplified signal from the amplifier 38 is provided to a timing discriminator 40 for detecting whether the amplified signal falls within a timing window generated by a timing controller 42. One type of timing controller 42 is an electronic clock, illustrated in greater detail in FIG. 3. An oscillator 44 provides a signal to a frequency divider 46, whose output is provided to an amplifier 48 for internal testing, and to the timing discriminator 40. Other types of clocks or timing devices, such as a computer or mechanical timer, may replace the illustrated electronic clock while providing generally the same type of timing control signal to the timing discriminator 40.

The output signal from the timing discriminator 40, which is nonzero only if there is a signal falling within the timing window, is provided to a threshold detector 50 for determining whether the amplified signal has an amplitude greater than a minimum amplitude level provided as an input value to an amplitude detection controller 52 by the operator. If the signal amplitude is greater than the input value, then an increment to an item counter 54 is made, and further signal processing is undertaken to determine whether the item is an article 24. That is, it is possible that something other than an article 24 caused the reflected signal to be of sufficient amplitude to be counted, but further signal processing is required to determine whether the counted item is properly considered an article 24 and included in the package. In the illustrated embodiment, if the subsequent signal processing determines that the item counted is not an article 24, the entire batch is discarded to a sorting machine. The output of the threshold detector 50 may also be digitized by an analog-to-digital converter 56, for provision to other devices such as a coincidence detector 58, as will be described subsequently.

In the preferred embodiment, six separate approaches are taken in analyzing the waveform of the amplified received signal to determine whether the signature of the received signal is characteristic of the signature of the article 24. An acoustic signature of an article is a waveform characteristic of that article. The signature can depend upon many factors and aspects of the article, such as its size, configuration, orientation, and composition. A signature of a desired article 24 is measured in a controlled environment by the apparatus 20 and placed into the memory of an article signature controller 60, so that this control signal can be used as a reference signal in an article-signal comparator 61 for comparing signals later measured by the apparatus 20. Determination of the signature of an article requires a determination of one or several waveform characteristics whereby the desired article 24 may be uniquely identified by the logic of the apparatus 20. The six waveform analysis approaches to be described have been found adequate for most applications to define a unique signature, although it is possible that fewer than these six may be sufficient, or other waveform analyses may be required. The following disclosure will relate to the six presently preferred techniques.

The first of these analyses is the transit time between the emission of the signal from the transreceiver 26 and receipt of the reflected signal back at the transreceiver 26. The determination of the transit time is performed in a transit time analyzer 62, which receives a signal marking the emission of each acoustic wavetrain pulse from the transreceiver 26 and also receives the amplified received signal. The transit time analyzer 62 determines the time duration between the start of the transmitted pulse and the start of the received pulse, and provides this value to a comparator for comparison with a standard value for the article 24, determined previously and input from the article signal controller 60, in the article-signal comparator 61. The transit time is generally found to be responsive to the height of the article 24. Although the delay time is not in the strictest sense a function of waveform, this analysis is included within the terminology "waveform analysis" as used herein.

The second of the types of waveform analyses presently preferred is peak detection, performed in a peak analyzer 64. The amplitude of the signal transmitted by the transmitter 18 and the amplified received signal are provided to the peak analyzer 64, which compares the maximum amplitude of the amplified received signal to that of the transmitted signal, and provides the ratio to the article-signal comparator 61, for comparison with an input corresponding to that of the article 24. The peak ratio is generally responsive to the composition, height and shape of the article 24.

Figure 6:
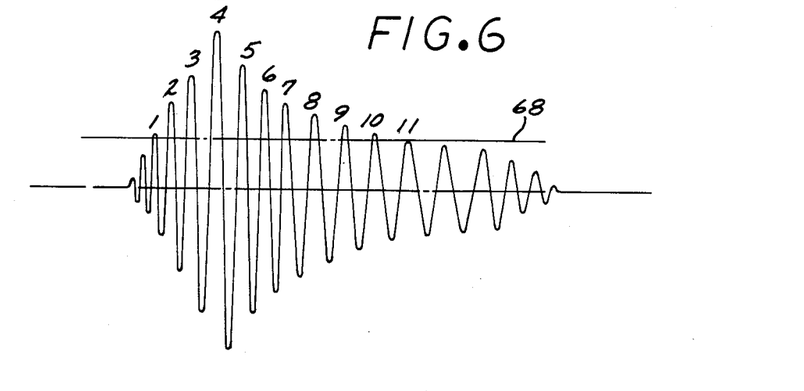
FIG. 6 is a schematic received signal waveform illustrating the ringdown count.

The third of the waveform analyses is a ringdown analysis performed in a ringdown counter 66. As illustrated in FIG. 6, the ringdown count is defined as the number of times a signal exceeds a threshold value 68.

The ringdown count is provided to the article-signal comparator 61, for comparison with the corresponding input value for the article 24. The ringdown count is a weighted average affected by the frequency, amplitude, and duration of the waveform signal, and is generally responsive to the composition of the material within the target zone 22.

Figure 7:
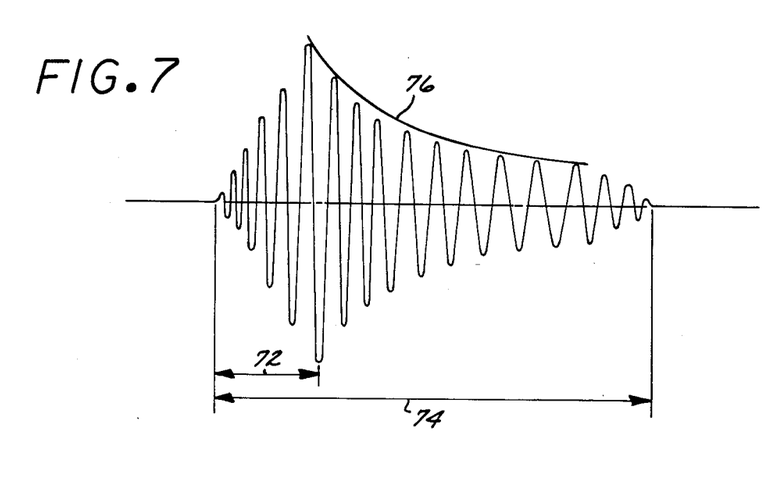
FIG. 7 is a schematic received signal waveform illustrating analysis by rise time, duration, and decay rate.
Figure 8:
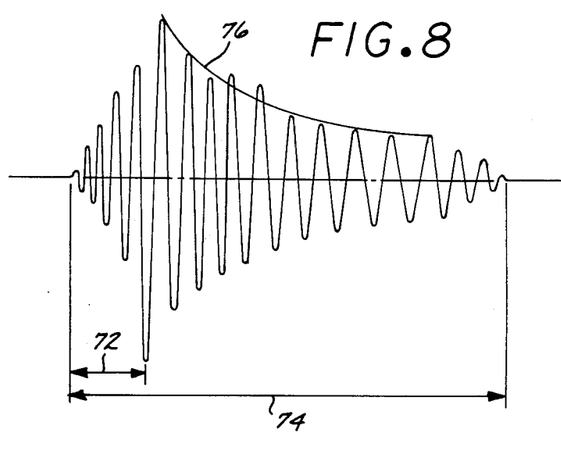
FIG. 8 is a schematic received waveform signal having a sharp negative maximum.
Figure 9:
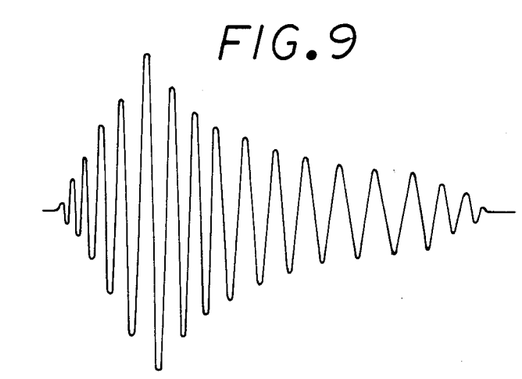
FIG. 9 is a schematic received time domain waveform signal.

The fourth of the types of waveform analysis is the shape of the amplified received signal, performed by a wave shape analyzer 70. As illustrated in FIG. 7, the wave shape may be characterized by a rise time 72, duration 74, and decay rate 76. These values are determined by the wave shape analyzer 70 and provided to the article-signal comparator 61, for comparison with the input values for the article 24.

Figure 10:
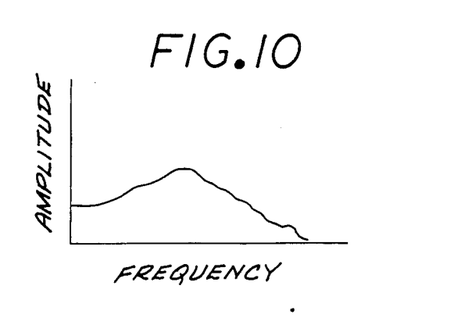
FIG. 10 is a schematic Fourier spectrum analysis of a waveform such as that of FIG. 9.

In the fifth type of analysis, the waveform of the amplified received signal is Fourier transformed into its component frequencies by a Fourier analyzer 78. As is well known, a periodic signal may be decomposed into an additive series of harmonics by Fourier analysis, as illustrated by FIG. 10. Here the Fourier components of the amplified received signal are provided to the article-signal comparator 61, for comparison with the corresponding values for the article 24. The Fourier transform of the amplified received signal is generally responsive to the shape of the item which reflects the transmitted signal.

Figure 11:
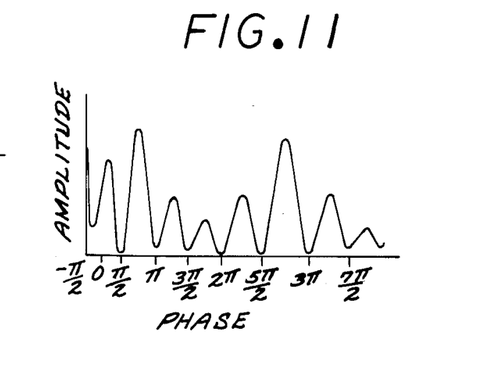
FIG. 11 is a schematic phase-amplitude distribution analysis of a waveform such as that of FIG. 9.

The sixth form of analysis is phase-amplitude or phase-difference measurement, as illustrated in FIG. 11. In a procedure somewhat similar to that of Fourier analysis, the amplitude-phase measurement of the reflected signal is made in a phase detector 80, and provided to the article-signal comparator 61. The difference in the amplitude-phase relationship of the transmitted and received signals may also be compared as a component of the article signature.

The article-signal comparator 61 compares the signals provided by the transit time analyzer 62, the peak analyzer 64, the ringdown counter 66, the wave shape analyzer 70, the Fourier analyzer 78, and the phase detector 80 with corresponding values provided as input values from the article signature controller 60 prior to the start of the scanning operation. The input values are determined prior to scanning the target area 22 in operation by placing known items, including samples of the article 24, into the target area 22 and measuring the respective values. These values become standards to be measured against in subsequent operations. Comparison tolerances for each parameter are also input through a tolerance controller 82 to the article-signal comparator 61. That is, it is not expected that each of the analysis parameters will always be exactly the same for each succeeding article 24, due to a variety of reasons. A minor tolerance or window is therefore provided, so that minor variations of one or more of the article parameters will not result in an improper rejection of the article. Conversely, it is attempted to keep these windows as narrow as possible, to minimize the chance that an object not an article 24 will not be counted as an article 24.

Although six specific waveform analyses have been discussed here, other types of waveform analyses are known and may be used where appropriate. Other such analyses include sing-around, null phase, interferometry and zero-amplitude methods. However, for the applications here discussed, the six analyses described above have been found fully sufficient. In most cases, fewer than these six analyses have been found adequate.

The article-signal comparator 61 determines whether measured waveform parameters are sufficiently close to the input standard values, within the input tolerances. If the values are found to be the same, then the article-signal comparator 61 increments an article counter 84. The article-signal comparator 61 may also include an internal counter, so that when the article count reaches a preselected value, a signal is sent to operate the packaging machine 86. Alternatively, if an item is found not to be an article 24, because the waveform analyses do not fall sufficiently close to the standard signature values, then the article-signal comparator 61 signals a sorting machine 88 to re-sort the entire batch of objects and articles accumulated since the last signal to the packaging machine 86. Other logical operations may also be programmed, as desired, using microprocessors.

Figure 4:
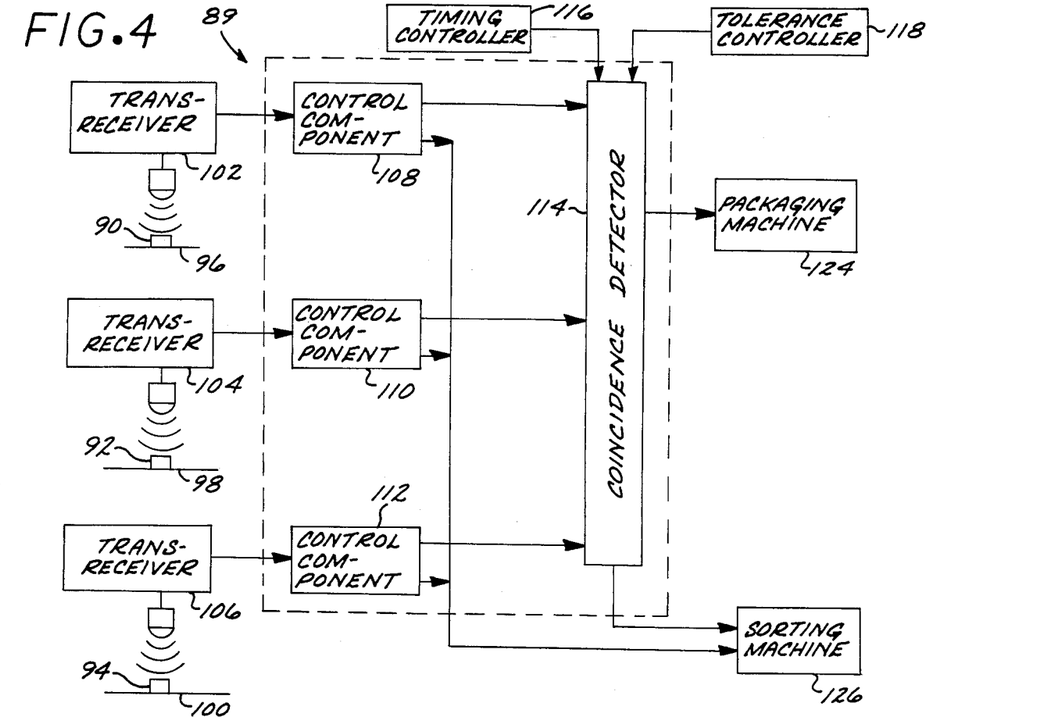
FIG. 4 is a partially schematic, partially block diagram of an automation coincidence control apparatus.

The embodiment just discussed relates to the packaging of one or more of one type of article 24 in a package. In other applications, it is required that several different types of articles be packaged in a single package, or that differing numbers of different types of articles be packaged in a single package. FIG. 4 illustrates another aspect of the present invention as applied to the packaging of more than one type of article in a single package. As an example, it may be desired to package one nut, one bolt, and one washer in a single package. The package is considered as not properly filled if only two of the three articles are present, or if there are two nuts, one bolt, but no washer, for example.

An automation coincidence control apparatus 89 allows the determination of whether a plurality of objects are within a plurality of respective target areas, and if so, the determination of whether the respective objects meet predetermined acceptability criteria, the presence of the acceptable articles to occur within a preselected timed relationship to each other. Taking as an example the case of packaging three different articles 90, 92 and 94, acoustic signals are emitted into the respective target zones 96, 98 and 100 from the respective transreceiver units 102, 104, and 106. Respective automation control components 108, 110, and 112 each embody the automation control apparatus 20 described above in form, function, and input/output characteristics.

Figure 5:
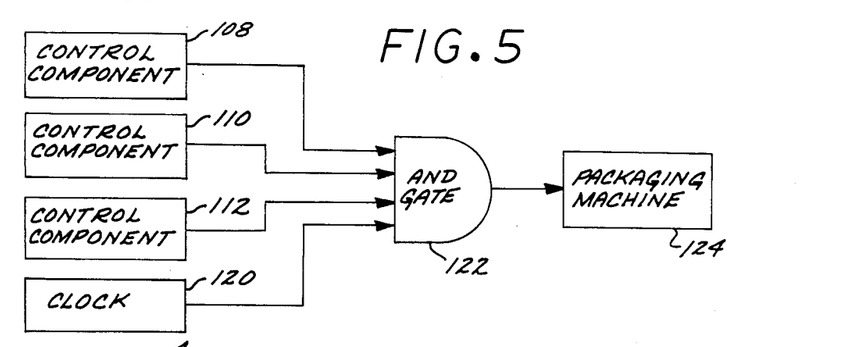
FIG. 5 is a schematic diagram of a signal timing logic unit.

Packaging input parameters are provided to the coincidence detector 114 from a coincidence timing controller 116 and a coincidence tolerance controller 118. That is, the requirements of the control components 108, 110, and 112 must be met by the presence of the proper articles 90, 92, and 94, but in some cases these articles must enter or be present in the target zones 96, 98, and 100 in some preselected timed relationship. The coincidence timing controller 116 and the coincidence tolerance controller 118 allow an operator to input these parameters and their tolerances. One common timing-relation approach is illustrated in FIGURE 5. Here, the signals from the control components 108, 110, and 112 are AND'ed with the output signal of a clock 120, such as that illustrated in FIG. 3 by an AND gate 122, so that a positive signal to a packaging machine 124 is achieved only if the articles 90, 92, and 94 reach the target zones 96, 98, and 100 in the window defined by the clock 120. Otherwise, a signal is sent to a sorting machine 126 which re-sorts the objects. Of course, many other types of logical procedures are possible for specific automated operations.

Thus, two output signals are possible from each of the automation control components 108, 110 and 112. If the article criteria for any of the control components is not met, then that control component outputs a signal to the sorting machine indicating that the item placed in the respective target zone was not a proper article. If a proper article is placed into the target area for each of the control components 108, 110, and 112, then a signal so indicating is provided from each of the control components to the coincidence detector 114. Prior to the beginning of operations, preselected timing parameters are input to the coincidence detector 114. These timing parameters are selected based upon the requirements of the particular operation. As an alternative to simultaneous arrival, it might be required that the nut arrive at its target area one second before the bolt arrives at its target area, and that the bolt in turn arrive at its target area one second before the washer arrives at its target area, so that the articles will go into the package in that order. Whatever the requirement, this information is provided as input to the coincidence detector 114. Tolerances are also input to the coincidence detector 114. The internal circuitry of the coincidence detector 114 is therefore a multifunctional comparator to detect whether the signals from the control components 108, 110, and 112, indicating the presence of the respective articles 90, 92, and 94, meet the input timing parameters, within the tolerances provided. If all of the article signals do meet the timing criteria, then a signal is sent to the packaging machine 124, indicating that the three articles are to be packaged together. If the article signals do not meet the timing criteria, then the coincidence detector signals the sorting machine 126 to remove the articles 90, 92, and 94 so that they are not packaged.

The preferred components utilized to construct the apparatus 20 and 89 are available commercially. The transreceiver 26 includes a broadband, wide beam angle, high input impedance, low output impedance, piezoelectric transducer having a frequency of from about 20 to about 500 kHz, and preferably about 40 kHz. Such transreceivers are available as the Messa model E200 or the Panametrics Model .5/1. The transreceiver driver 30 which drives the transreceiver 26 may be a standard pulser/receiver such as the Panametric Model 5052 PR. The transreceiver 26 is preferably excited by the driver 30 to transmit a pulse of about 50 to about 300 volts with a rise time of less than about 50 nanoseconds.

The amplifier 38 is a band pass amplifier having a gain of at least about 20 to about 60 dB. This amplifier 38 also filters the signal over a narrow band pass about the central frequency of the transreceiver 26. Examples of suitable band pass amplifiers include the Panametric Model 5660, 5670, or 5676; the Hewlett-Packard Model 8447E, and the Tektronix Model AM501.

The timing discriminator 40 is a commercially available time gate allowing passage of a signal only within a predetermined time period. Satisfactory timing discriminators include the Hewlett-Packard Model 652A or 654A, and the Tektronix Model G505. The threshold detector 50 is an electronic switch which is off when the signal is below a threshold value and on when the signal is above that threshold value, and is available commercially as a Panametric Model UA 5600.

The analog-to-digital converter 56 is preferably of about 2 MHz clock rate, 12 bit resolution design, such as the Hewlett-Packard Model 3421A or Fluke Model 2240.

The construction of the components utilized to analyze the wave form of the reflected signal are known in the art, and the various components are commercially available. The transient time analyzer 62 should have a two MHz clock rate, and is available commercially as the Biomation Model 4500 or the Nicolet Model 4094. The peak analyzer 64 is available as a standard Panametrics Model 5052G. The ringdown counter is commercially available as an AET Model 5000 or a PAC Model 6400. The wave shape analyzer is available commercially as an Analogic Model 6000, 610, or 620, or a Biomation Model 8000. The Fourier or frequency analyzer 78 is available commercially as a Hewlett-Packard Model 8569 or a Tektronix Model 492P or 7L5. The phase detector 80 is available commercially as a Cochlea Model Sonovision.

The article-signal comparator 61 and the coincidence detector 114 are logical units which may be constructed from standard microprocessor based components. The exact construction of each of these components depends upon the required function of that component and the selected logical operation.

The preferred apparatus described previously and constructed of commercial components has a capability of 50,000 articles per second, although such high rates are not expected in conventional operations. Resolutions of better than 10 percent can be achieved in article height discrimination, so that differences of 0.1 inch in a 1 inch article can be detected. A one inch diameter transreceiver 26, positioned 12 inches above a target area 22, can detect and analyze articles having linear dimensions in the range of about ½ inch to about 4 inches, although other size articles may be readily accommodated by varying transreceiver placement and geometry.

It will now be appreciated that, through the use of this invention, automated apparatus may be controlled more precisely and in a variety of operating environments. Although a particular embodiment of the invention has been described in detail for purposes of illustration, a variety of modifications to suit particular automated operation needs may be made without departing from the spirit and scope of the invention. Accordingly, the invention is not to be limited except as by the appended claims.

What is claimed is:

1. An automation control apparatus for determining whether an object is within a target area, and, if so, for determining whether the object meets predetermined acceptability criteria to be classified as a desired article, comprising:

means for emitting a beam of acoustic energy toward the target area;

means for receiving a signal back from the target area;

means for amplifying the signal received back from the target area;

means for determining whether the amplified signal has an amplitude greater than a predetermined value;

waveform analysis means for analyzing the amplified signal to determine its waveform characteristics, and for comparing the waveform characteristics with the predetermined acceptability criteria; and means for signalling the presence and acceptability of the article.

2. The apparatus of claim 1, wherein said means for emitting and said means for receiving are embodied in a single transreceiver.

3. The apparatus of claim 1, wherein said transreceiver includes an acoustic lens.

4. The apparatus of claim 1, wherein said means for amplifying is a band pass amplifier.

5. The apparatus of claim 1, wherein said means for determining is an amplitude threshold detector.

6. The apparatus of claim 1, wherein said waveform analysis means includes a transit time analyzer.

7. The apparatus of claim 1, wherein said waveform analysis means includes a peak analyzer.

8. The apparatus of claim 1, wherein said waveform analysis means includes a wave shape analyzer.

9. The apparatus of claim 1, wherein said waveform analysis means includes a ringdown counter.

10. The apparatus of claim 1, wherein said waveform analysis means includes a phase detector.

11. The apparatus of claim 1, wherein said waveform analysis means includes a Fourier analyzer.

12. The apparatus of claim 1, further including means for signalling the absence and rejectability of the article.

13. The apparatus of claim 1, further including means for determining whether an article is present in a preselected time period.

14. An automation coincidence control apparatus for determining whether a plurality of objects are within a plurality of respective target areas, and, if so, for determining whether the respective objects meet predetermined acceptability criteria to be classified as desired articles, the presence of acceptable articles to occur within a preselected timed relationship to each other, the apparatus comprising:

a plurality of individual automation control components, each of said components including
  means for emitting a beam of acoustic energy toward the respective target area,
  means for receiving a signal back from the target area,
  means for amplifying the signal received back from the target area,
  means for determining whether the amplified signal has an amplitude greater than a predetermined value,
  waveform analysis means for analyzing the amplified signal to determine its waveform characteristics, and for comparing the waveform characteristics with predetermined acceptability criteria, and
  means for signalling the presence and acceptability of the respective object; and coincidence detection means for determining that signals from the respective automation control components occur in a preselected timed relationship to each other.

* * * * *